United States Patent
You et al.

(12) 
(10) Patent No.: US 6,210,867 B1
(45) Date of Patent: Apr. 3, 2001

(54) METHOD FOR FABRICATING LOW-LOSS OPTICALLY ACTIVE DEVICE

(75) Inventors: Byong-gwon You, Daejeon; Hyung-jae Lee, Seoul; Tae-hyung Rhee, Sungnam; Yong-woo Lee, Yongin, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/031,064

(22) Filed: Feb. 26, 1998

(30) Foreign Application Priority Data

Feb. 26, 1997 (KR) .................................................... 97-6018

(51) Int. Cl.[7] .................................................... G02F 1/35
(52) U.S. Cl. ........................... 430/321; 430/394; 216/24; 385/5; 385/122; 385/132
(58) Field of Search .................................. 385/122, 132, 385/5, 8, 130, 129; 216/24; 430/320, 321, 394

(56) References Cited

U.S. PATENT DOCUMENTS 3,842,289 * 10/1974 Yariv et al. ..................... 350/96 WG
3,920,314    11/1975 Yajima ................................. 350/96

(List continued on next page.)

FOREIGN PATENT DOCUMENTS 0 477 898 A2   9/1991 (EP) .
6-067230   *  5/1991 (JP) .

(List continued on next page.)

OTHER PUBLICATIONS

"Optical Integrated Circuit", Nishihara et al., issued Aug. 20, 1993, pp.198–203. (In Japanese).

(List continued on next page.)

Primary Examiner—Martin Angebranndt
(74) Attorney, Agent, or Firm—Robert E. Bushnell, Esq.

(57) ABSTRACT

A method for fabricating low-loss optically active device having an optical waveguide constructed of an optical waveguide core region (non-linear core region) necessitating the non-linear effect when waveguiding an optical signal, and an optical waveguide core region (linear core region) not necessitating the non-linear effect, the method includes method for fabricating an optically active device having an optical waveguide constructed of an optical waveguide core region (non-linear core region) necessitating the non-linear effect when waveguiding an optical signal, and an optical waveguide core region (linear core region) not necessitating the non-linear effect, the method includes the steps of: forming a lower clad layer having a refractive index lower than the material of the waveguide core regions and optical transparency on a substrate, forming a linear optical polymer layer on the lower clad layer by coating linear optical polymer having a refractive index lower than the material of the lower clad layer, forming a first metal layer at a region on the lower clad layer, other than the regions where the waveguide is to be disposed, etching a linear optical polymer layer without the first metal layer formed thereon, forming a non-linear optical polymer layer on the substrate having the non-linear core region, removing the non-linear optical polymer layer stacked to be higher than the waveguide core regions, removing the first metal layer, forming a second metal layer on the waveguide from which the first metal layer is removed, removing the linear optical polymer of the non-second metal layer portion, and forming an upper clad layer on the substrate with the linear optical polymer using a material having a refractive index lower than the waveguide core regions and optical transparency. The waveguide is formed using non-linear optical polymer only at the region where the non-linear effect such as optical modulation or optical switching occurs, and is formed using linear optical polymer at the remaining regions, thereby minimizing the overall waveguiding loss of the waveguide.

19 Claims, 7 Drawing Sheets

U.S. PATENT DOCUMENTS

| | | | |
|---|---|---|---|
| 4,887,884 | 12/1989 | Hayden | 350/96.29 |
| 5,006,285 | 4/1991 | Thackara et al. | 264/1.3 |
| 5,007,696 | 4/1991 | Thackara et al. | 350/96.14 |
| 5,103,492 | 4/1992 | Ticknor | 385/9 |
| 5,181,262 | 1/1993 | Gerardus et al. | 385/16 |
| 5,191,630 | 3/1993 | Tajima | 385/122 |
| 5,202,786 | 4/1993 | Boyle et al. | 359/243 |
| 5,255,334 | 10/1993 | Mak et al. | 385/41 |
| 5,282,078 * | 1/1994 | Horsthuis | 385/122 |
| 5,315,422 | 5/1994 | Utaka et al. | 359/107 |
| 5,359,679 | 10/1994 | Tanaka et al. | 385/8 |
| 5,371,817 * | 12/1994 | Revelli, Jr. et al. | 385/44 |
| 5,376,506 | 12/1994 | Ehrfeld et al. | 430/321 |
| 5,546,480 | 8/1996 | Leonard | 385/3 |
| 5,555,326 | 9/1996 | Hwang et al. | 385/2 |
| 5,617,499 | 4/1997 | Brueck et al. | 385/122 |
| 5,692,075 | 11/1997 | Hwang et al. | 385/3 |
| 5,703,975 | 12/1997 | Miller et al. | 385/16 |
| 5,712,935 | 1/1998 | Miyakawa | 385/22 |
| 5,788,856 * | 8/1998 | Kuhn | 216/24 |

FOREIGN PATENT DOCUMENTS

| | | | |
|---|---|---|---|
| 5-127207 * | 5/1993 | (JP) | 385/122 |
| 6-214274 | 8/1994 | (JP) . | |
| 08146475 | 7/1996 | (JP) . | |
| WO 96/42027 | 12/1996 | (WO) . | |

OTHER PUBLICATIONS

Elliott, David J., "Integrated Circuit Fabrication Technology", McGraw–Hill pp. 4–9,26–31 & 304–309, 1982.*

* cited by examiner

METHOD FOR FABRICATING LOW-LOSS OPTICALLY ACTIVE DEVICE

CLAIM FOR PRIORITY

This application makes reference to, incorporates the same herein, and claims all benefits accruing under 35 U.S.C. § 119 from an application for a METHOD FOR FABRICATING LOW-LOSS OPTICALLYACTIVE DEVICE earlier filed in the Korean Industrial Property Office on the day of Feb. 26, 1997, and there duly assigned Ser. No. 1997/6018.

BACKGROUND OF THE INVENTION

1. Field of the Invention

The present invention relates to optical devices and to processes for fabricating optical devices generally, and, more particularly, to low-loss optically active devices exhibiting reduced losses and to processes of fabricating optically active optical devices.

2. Description of the Related Art

In forming optically active devices such as an optical modulator or an optical switch using optical polymer, an optical waveguide formed in the device is constituted of cores and upper and lower clads surrounding the cores. Here, the refractive index of the material used for the core is always greater than the refractive index of materials used for the clads. This difference in refractive indices makes the light passing through the core travel along the waveguide due to total internal reflection. Optical polymer is conventionally used in fabricating optically active devices non-linear characteristics. Typically, all core regions of the waveguide formed in the device are made of non-linear optical polymer. An exemplary structure may be found, for example, in the Electro-optic Channel Waveguide of J. I. Thackara, et alii, U.S. Pat. Nos. 5,006,285 and 5,007,696. If, as indicated for example, by the Nonlinear Optical Device For Controlling A Signal Light By A Control Light of K. Tajima, U.S. Pat. No. 5,191,630, all of the core regions of the waveguide forming an active device are made of non-linear optical material such as a non-linear optical polymer, we have noticed that the overall device loss characteristics are degraded. The waveguiding loss of a waveguide made of non-linear optical polymer exhibits a characteristic of about 0.5–1.0 dB/cm, and the waveguiding loss of the waveguide made of linear optical polymer exhibits a characteristic of about 0.1–0.2 dB/cm. Therefore, in the case of forming a waveguide having the same length and configuration with each other, a waveguide made entirely of only the non-linear optical polymer have disadvantages due to the substantial, and in our opinion unnecessary injection losses of the device, compared to the case of forming a waveguide made of the linear optical polymer. Directional coupler type optical switches and conventional Mach-Zehnder type optical modulators (e.g., the Hybrid All Optical Silica Waveguide Modulator Using Non-linear Electro-optic Components of J. Leonard, U.S. Pat. No. 5,546,480; the Mach-Zehnder Type Electro-optic Polymer Modulator In Which An Initial Output State can Be Controller By Post-photobleaching, of W. Y. Hwang, et alii, U.S. Pat. No. 5,692,075), as well as such devices as the Capillaiy Non-linear Optical Waveguide Device of L. M. Hayden, U.S. Pat. No. 4,887,884, conventionally have all regions in the waveguide including the electrode regions, formed of non-linear optical polymer that exhibits a comparatively higher optical loss than does linear optical polymer; consequently, the overall injection loss of the device is substantially increased.

SUMMARY OF THE INVENTION

It is therefore, one object of the present invention to provide low-loss optically active devices exhibiting reduced losses and processes for fabricating optically active optical.

It is another object to provide optically active devices that exhibit reduced waveguiding losses.

It is still another object to provide processes for forming waveguide cores by injecting non-linear optical polymer into only a waveguide region where a non-linear effect occurs.

It is yet another object to provide a process for fabricating low-loss optically active devices using optical polymer for reducing the waveguiding losses of waveguides in comparison devices formed with all core regions of the waveguide made of non-linear optical polymer.

It is still yet another object to provide low-loss optically active devices and processes for fabricating low-loss optically active devices constructed with only the core regions of the waveguide where optical modulation effects occur being formed of non-linear optical polymer.

It is also an object to provide low-loss optically active devices and processes for fabricating low-loss optically active devices constructed with only the core regions of the waveguide where optical modulation effects occur being formed of non-linear optical polymer, and with the waveguide of the remaining core regions being formed of linear optical polymer.

It is a further object to provide active optical devices and processes for fabricating active optical devices with opposite waveguide regions made of cores of linear optical polymer, feeding an intervening active or modulating region made of a non-linear polymer.

These and other objects may be achieved with optically active devices and a process for fabricating optically active devices that have an optical waveguide constructed of an optical waveguide core region (i.e., a non-linear core, or active, region) operating to produce a non-linear effect when waveguiding an optical signal, and an optical waveguide core region (i.e., a linear core, or waveguide, region) that does not require a non-linear effect while conducting an optical signal to, or from, the active region. A lower clad layer is formed on a substrate with a refractive index that is lower than the material of the waveguide core regions and an optical transparency. A linear optical polymer layer is then formed on the lower clad layer by coating linear optical polymer having a refractive index lower than the material of the lower clad layer. A first metal layer is then formed at a region on the lower clad layer, other than at those regions where the waveguide is to be disposed. The linear optical polymer layer without the first metal layer formed thereon is etched. A non-linear optical polymer layer is formed on the substrate having the non-linear core region. The non-linear optical polymer layer that is stacked higher than the waveguide core regions is removed, and the first metal layer is removed. A second metal layer is formed on that part of the waveguide from which the first metal layer has been removed, and the linear optical polymer of the non-second metal layer portion is removed. An upper clad layer is formed on the substrate with the linear optical polymer by using a material that has both a refractive index that is lower than the waveguide core regions and optical transparency.

Preferably, the linear optically polymer is a material that is optical transparent at the wavelength of the light being used, and that has an optical waveguiding loss that is lower than that of the non-linear optical polymer. Also, electrodes may be formed on, beneath, or both on and beneath the region made of the non-linear polymer to provide the non-linear effect thereto.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

Figure 1A:
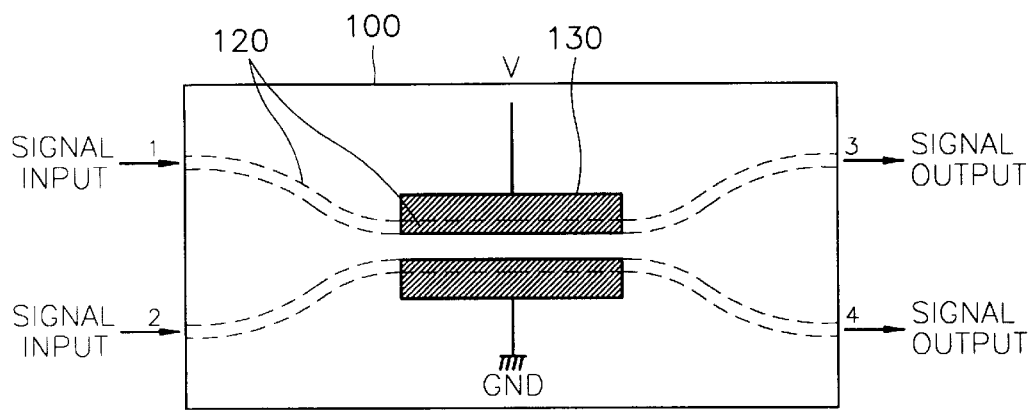
FIG. 1A shows a conventional directional coupler type optical switch constructed with all of the cores of the waveguide constituting the switch formed of non-linear polymer.
Figure 1B:
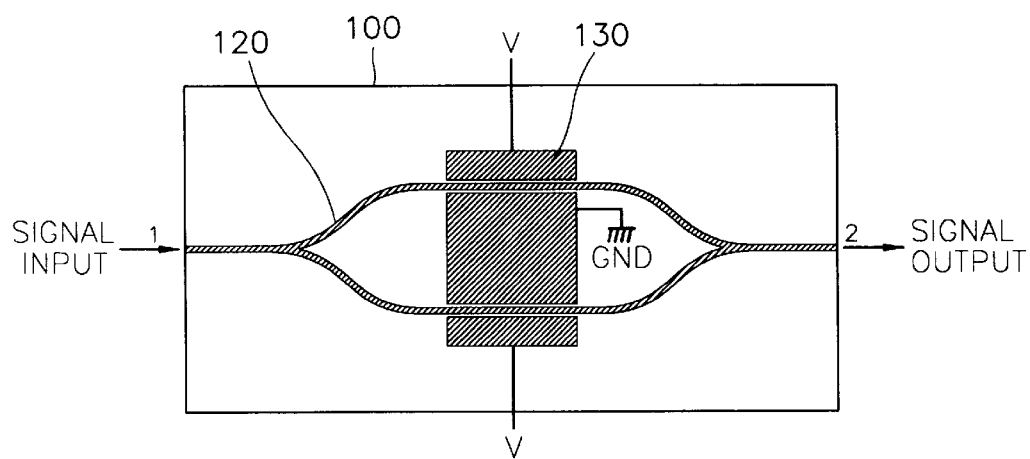
FIG. 1B shows a conventional Mach-Zehnder type optical modulator.

Turning now to the drawings, FIGS. 1A and 1B respectively show a conventionally constructed directional coupler type optical switch 20 and a conventionally constructed Mach-Zehnder type optical modulator 30. As shown, since all regions in the waveguide that include an electrode 130 are formed of non-linear optical polymer exhibiting a comparatively higher optical loss than a linear optical polymer, the overall injection loss experienced by these devices is increased considerably.

Figure 2:
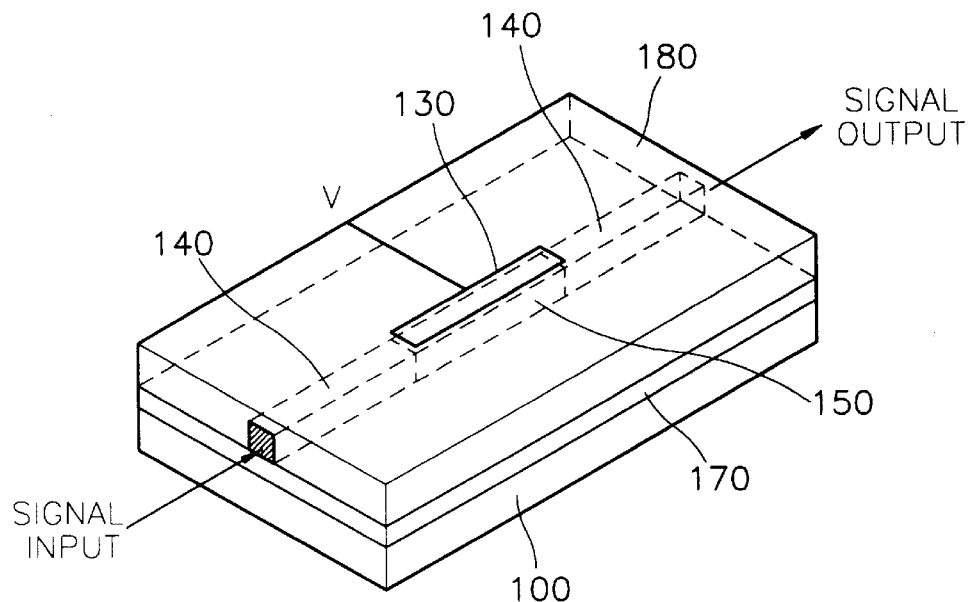
FIG. 2 is a schematic view illustrating a low-loss optically active device constructed as an embodiment of the present invention.

Referring now to FIG. 2, a low-loss optically active device 40 constructed according to the principles of the present invention may be fabricated with waveguide cores that are made of both linear optical polymer and non-linear optical polymer, and an electrode. The waveguide core made of the non-linear optical polymer is formed in a region where a non-linear effect occurs in the optically active device. The optically active device includes a substrate 100, a lower clad layer 170 disposed across substrate 100, and optical waveguides 140, 150 disposed as different lengths of a relatively linear structure extending across one linear dimension of lower clad layer 170. The optical waveguide has a non-linear core region 150 necessitating a non-linear effect and a linear core region 140 that does not depend upon any non-linear effect, respectively, for waveguiding and transmitting an optical signal. Upper clad layer 180 is disposed across the uncovered surface of lower clad layer 170 to encase optical waveguides 140, 150 and completely cover lower clad layer 170. Electrode 130 is disposed on the non-linear core region 150. The non-linear core region 150 is made of non-linear optical polymer and is positioned between linearly opposite linear core regions 140. Preferably, both core regions 140 are substantially optically identical. One end of linear core region 140 of the waveguide is connected to non-linear core region 150, and the other end of linear core region 140 is connected to either the input or output port of the optical signal. The linear core region 140 is made of linear optical polymer having a lower optical waveguiding loss than non-linear optical polymer. Also, the upper clad layer 180 are formed of materials having lower refractive indices than the refractive indices of the linear optical polymer and the non-linear optical polymer.

In fabricating a low-loss optically active device such as an optical switch or an optical modulator using non-linear optical polymer according to the present invention, a non-linear optical polymer material having non-linear optic chromophores as its functional groups is used. The linear optical polymer is a linear material having optical transparency to the wavelength of light currently being conducted and has lower optical waveguiding loss than the non-linear optical polymer.

Figure 3:
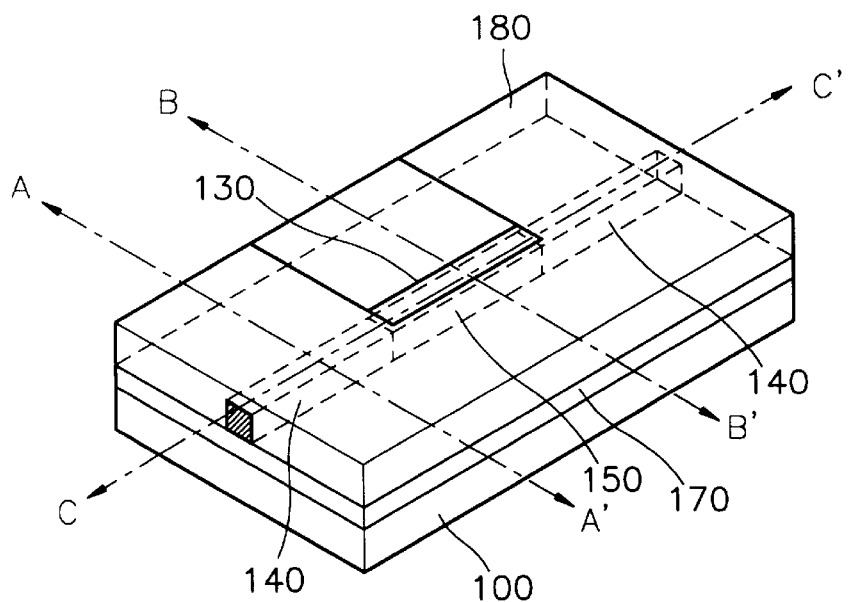
FIG. 3 is a view illustrating the definition of cross-section lines A–A', B–B' and C–C' in the overall arrangement of the present invention, for the sake of explanation.
Figure 4:
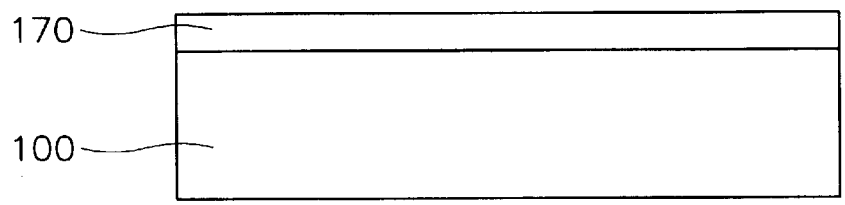
FIGS. 4 and 5 are cross-sectional views taken along sectional line C–C' to illustrate the step of etching linear optical polymer in a region necessitating non-linear optical polymer.

The method for fabricating a low-loss optically active device according to the present invention by injecting the non-linear optical polymer into only the region where the non-linear effect occurs, will now be described by reference to FIGS. 3 through 13C. FIG. 3 is a view illustrating the definition of cross-section lines A–A', B–B' and C–C' of the overall arrangement of the present invention, drawn for the sake of explanation of the present invention. First, a substrate 100 having a planar surface is formed from a silicon wafer or glass. Next, a lower clad layer 170 is formed on the surface of substrate 100. The material of the lower clad layer 170 has a refractive index less than the material of the cores and is optically transparent to the wavelength of light in use. FIG. 4 shows that the lower clad layer 170 is formed on one exposed surface of substrate 100.

Figure 5:
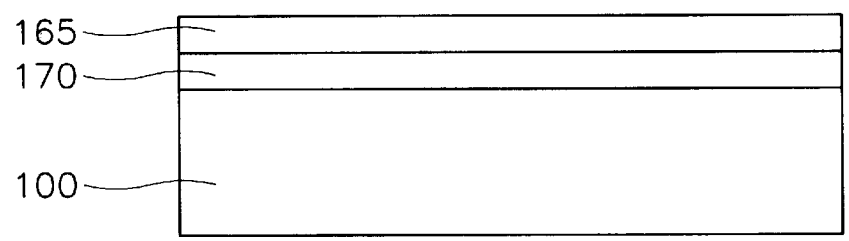

Next, as shown in FIG. 5, linear optical polymer having a refractive index greater than the material of the lower clad layer 170 is spin-coated on lower clad layer 170, thereby forming a linear optical polymer layer 165. Then, the resultant structure is baked, thereby improving film quality.

Figure 6A:
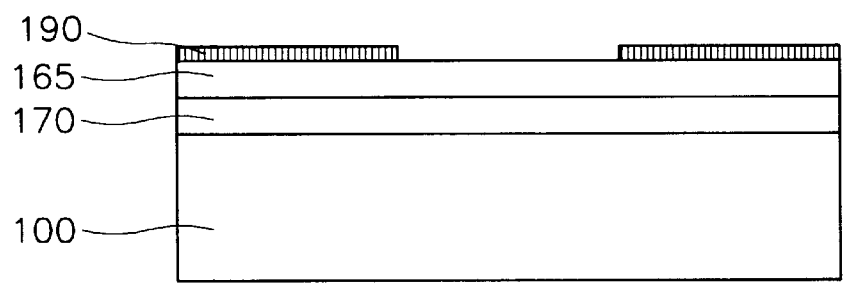
FIGS. 6A and 6B are cross-sectional views taken along sectional line C–C' shown in FIG. 3, and a plan view illustrating the step of forming a first metal layer on a lower clad layer and an linear optical polymer layer, respectively.
Figure 6B:
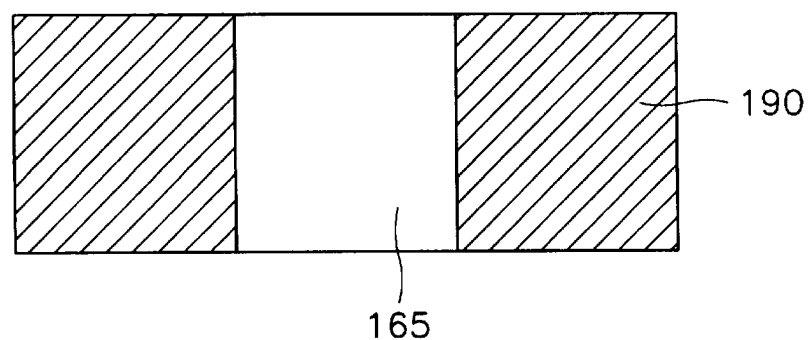

FIGS. 6A and 6B are a cross-sectional elevational view taken along the line C–C' shown in FIG. 3 and a plan view, respectively, illustrating that a first metal layer 190 is formed on the linear optical polymer layer 165. To form the first metal layer 190, photoresist (PR) is coated on the linear optical polymer layer 165 by a spin-coating method. Then, photomasks having a predetermined pattern are aligned on the substrate 100 and ultraviolet (UV) rays are selectively irradiated onto the photoresist PR. Thereafter, the photoresist PR is dipped into a developer liquid for development, and then baked, thereby forming a photoresist pattern defining the areas onto which first metal layer 190 is to be deposited. First metal layer 190 is deposited on linear optical polymer layer 165 by a vacuum deposition method such as by sputtering, electron beam or thermal evaporation. After deposition, the photoresist PR is lifted off, thereby completing the formation of first metal layer 190.

Figure 7:
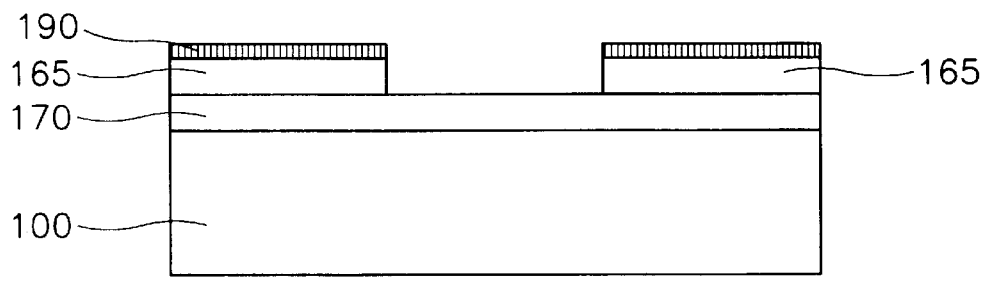
FIGS. 7 through 11 are flow diagrams, taken along sectional line C–C', illustrating a waveguide core made of non-linear optical polymer and a waveguide core made of linear optical polymer that have been selectively formed simultaneously at the region where the non-linear effect occurs, as a preferred embodiment of the present invention.

After completing the step shown in FIG. 6A, the exposed portion of layer 165 is etched. For example, $O_2$ plasma is applied over layer 165 under a vacuum state so that the first metal layer portion is not etched by the plasma and the non-first metal layer portion is etched by the plasma. FIG. 7 shows that the linear optical polymer layer 165 is partially etched away in region 167 by an etching method for later filling with non-linear optical polymer in region 167 necessitating the non-linear optical polymer.

Figure 8:
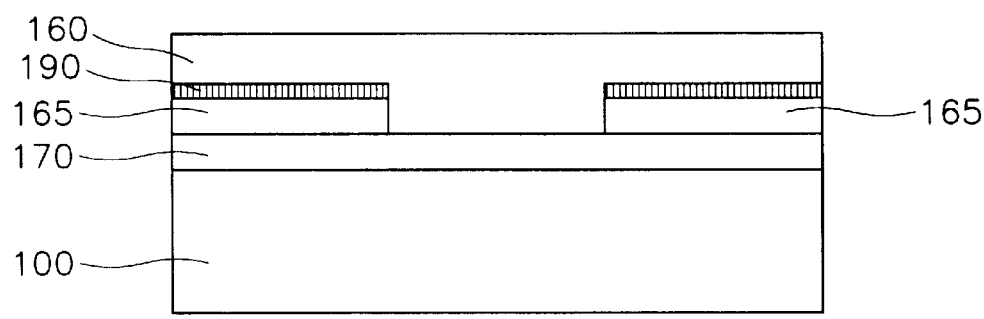

FIGS. 8 through 13C are flow diagrams for simultaneously forming a core 150 of the waveguide that is made of non-linear optical polymer placed selectively on a region 167 where the non-linear effect occurs, and a core 140 made of linear optical polymer, constructed as a preferred embodiment of the present invention. First, in order to fill the non-linear optical polymer in the region 167 where the non-linear effect occurs in the device, a non-linear optical polymer material having non-linear optic chromophores as its functional groups is spin-coated to form a non-linear optical polymer layer 160 on the exposed areas of layers 190, 165 and 170. FIG. 8 shows that the non-linear optical polymer layer 160 is formed by a spin-coating method, according to the principle of the present invention.

Figure 9:
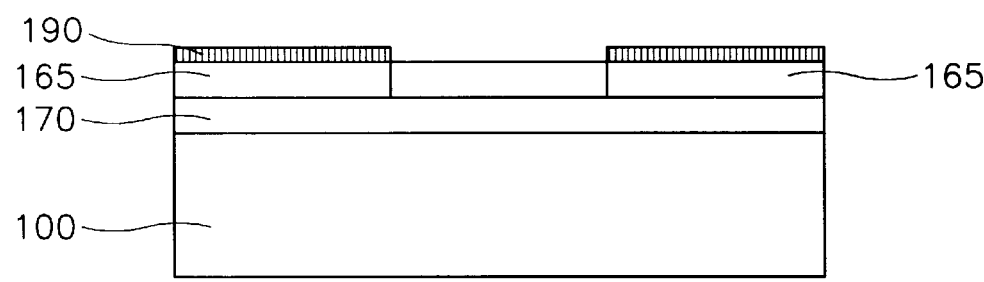
Figure 10:
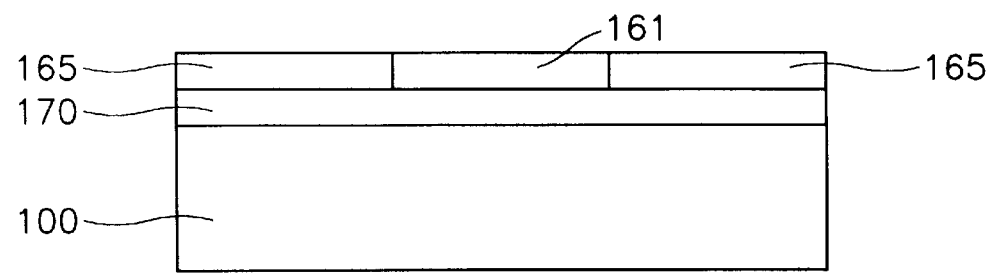
Figure 11A:
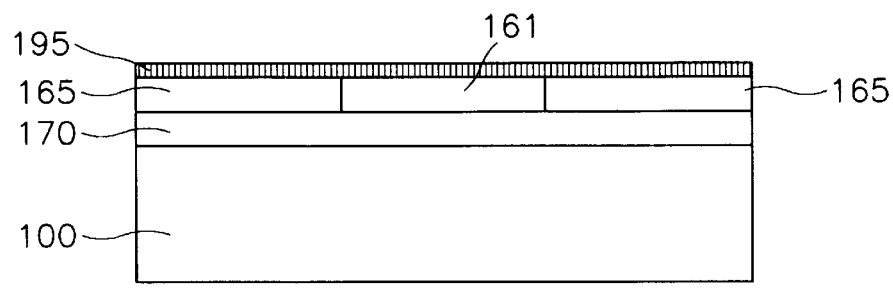
Figure 11B:
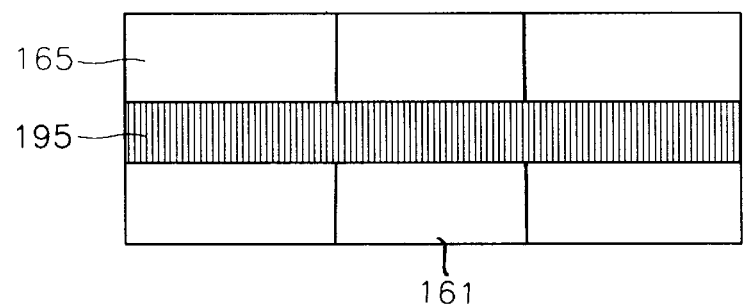
Figure 12A:
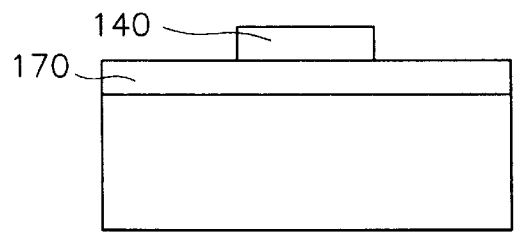
FIGS. 12A through 12C are cross-sectional views taken respectively, along sectional lines A–A', B–B', and C–C', of waveguide cores made of both linear optical polymer and non-linear optical polymer, formed by etching the polymer from the non-second metal layer portion and the second metal layer.
Figure 12B:
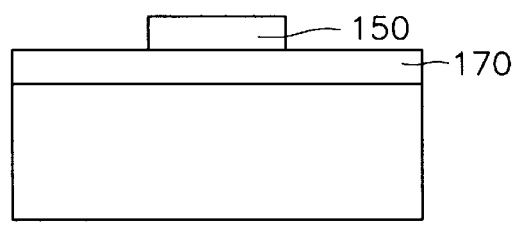
Figure 12C:
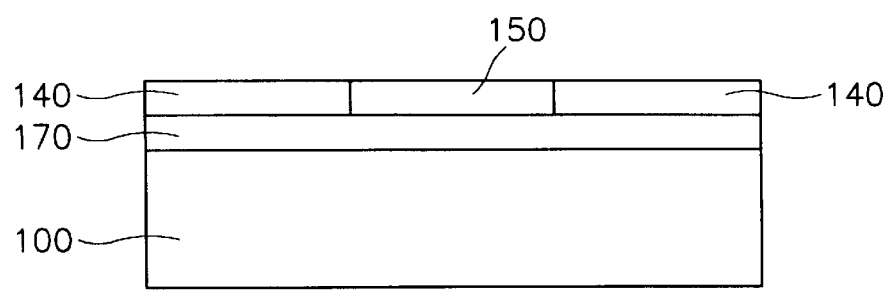
Figure 13A:
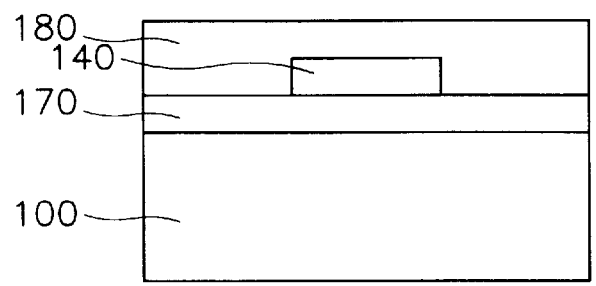
FIGS. 13A through 13C are cross-sectional views illustrating an upper clad layer formed of a material having a refractive index lower than the core materials and having optical transparency at the wavelength of the light being conducted by the waveguide cores of FIGS. 12A through 12C.
Figure 13B:
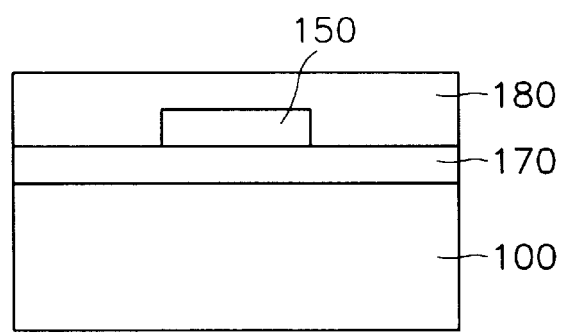
Figure 13C:
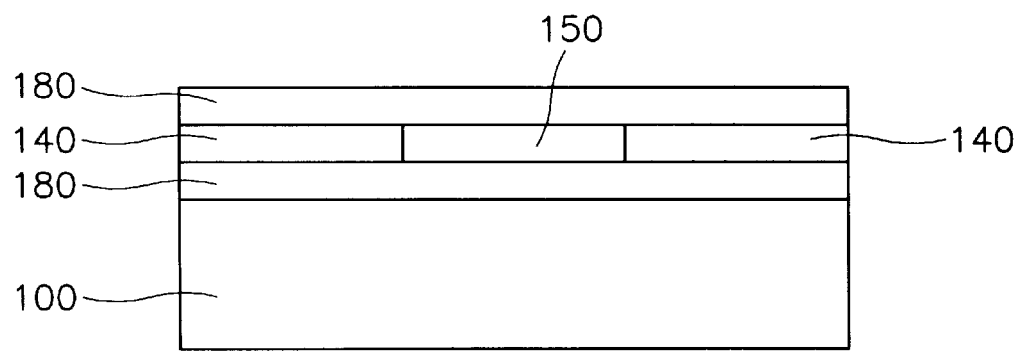

Then, as shown in FIG. 9, the non-linear optical polymer layer 160 above the waveguide core (i.e., that is thicker than linear optical polymer 165) is etched away. The height of non-linear optical polymer layer 160 that is higher than the height waveguide core is thereby reduced by selective etching to the same thickness as linear optical layer 165 formed by the spin-coating method, by the expedient of adjusting the etch rate during the etching step in order to form non-linear optical polymer layer 161. The linear optical layer 165 is protected by the first metal layer 190 from damage during the etching step. As shown in FIG. 10, the first metal layer 190, serving as a mask against etching by the plasma shown in FIG. 9 during the etching step is removed by etching, and then the second metal layer 195 is formed by vacuum deposition and photolithography as shown in FIGS. 11A and 11B to partially cover the exposed surface of the device dedicated to bearing the waveguide. This leaves the undesired portions of non-linear optical polymer layer 161 and linear optical polymer layer 165 exposed for removal by etching. FIG. 11A is a cross sectional elevational view taken along sectional line C–C' shown in FIG. 3, and FIG. 11B is a plan view taken over the substrate 100. Here, in the pattern of the second metal layer 195, the width of the second metal layer 195 is determined by the width of the waveguide to remain upon lower clad layer 170. Then, the polymer that is not protected by non-second metal layer 195 is etched away, and second metal layer 195 is then etched away, thereby completing the formation of cores 140 and 150 of the waveguide made with opposite lengths of linear optical polymer separated by an intermediate length of non-linear optical polymer. By doing so, it is not necessary to align these three successive lengths of the waveguide's cores precisely during formation of cores 140 and 150 of the waveguide made of these adjoining lengths of linear optical polymer and non-linear optical polymer. FIGS. 12A through 12C are cross-sectional views taken respectively, along sectional lines A–A', B–B' and C–C', of waveguide cores made of both linear optical polymer 140 and non-linear optical polymer 150 remaining after the etching steps. Thereafter, as shown in FIGS. 13A through 13C, an upper clad layer 180 is formed of a material having a refractive index lower than the core materials and having optical transparency at the wavelength of the light being conducted by waveguide lengths 140, 150, 140.

Next, the operation of the present invention will be described. FIG. 2 shows a low-loss optically active device constructed according to the principle of present invention so that waveguide cores 140 and 150 are made of both linear optical polymer and non-linear optical polymer. An electrode 130 and the waveguide core 150 made of the non-linear optical polymer are formed in a region where a non-linear effect occurs in the optically active device. The optical signal input from input port 200 at one end of the device passes through the waveguide core 140 made of the linear optical polymer with a low loss in optical travel in the region not characterized by the non-linear effect, by, for example, a voltage directly applied to the electrode 130 or an electric field applied within the optically active device. Then, the optical signal is changed in its optical characteristics by the voltage applied directly to the electrode 130, and the resulting electric field, while passing through the waveguide core 150 made of the non-linear optical polymer along this electrode portion. The altered optical signal passes subsequently through the waveguide core 140 made of the linear optical polymer and is output at the output port 210.

According to the conventional method, the entire waveguide core 150 is formed with the non-linear optical polymer having a higher waveguiding loss than the linear optical polymer, even in the waveguide region in which it is necessary for the optical signal to just travel without alteration by, for example, an electric field. Thus, the overall waveguiding loss of the device is increased, which increases the injection loss of the device. In contrast with the conventional method, according to the present invention, waveguide core 150 is made of non-linear optical polymer that is formed only at the region where the non-linear effect occurs, and the waveguide core 140 made of linear optical polymer is formed at the remaining regions, thereby lowering the overall waveguiding loss and injecting loss of the device.

Figure 14A:
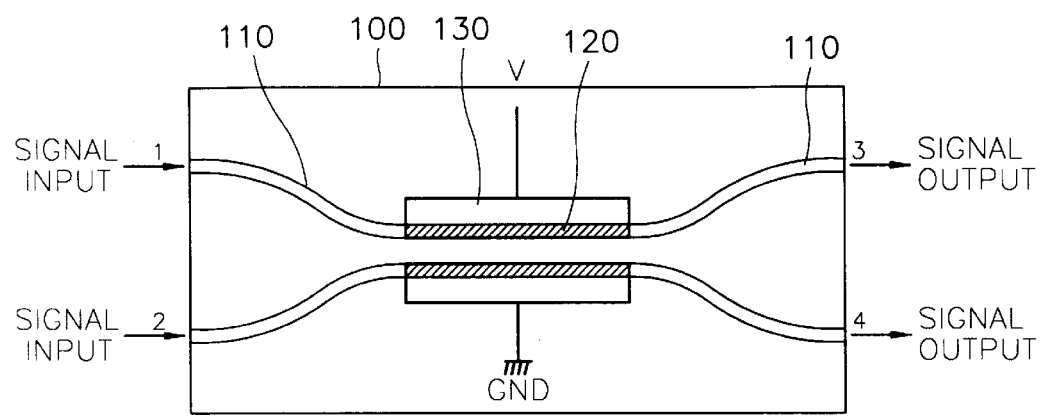
FIGS. 14A and 14B respectively show a directional coupler type optical switch and a Mach-Zehnder type optical modulator fabricated as preferred embodiments of the present invention.
Figure 14B:
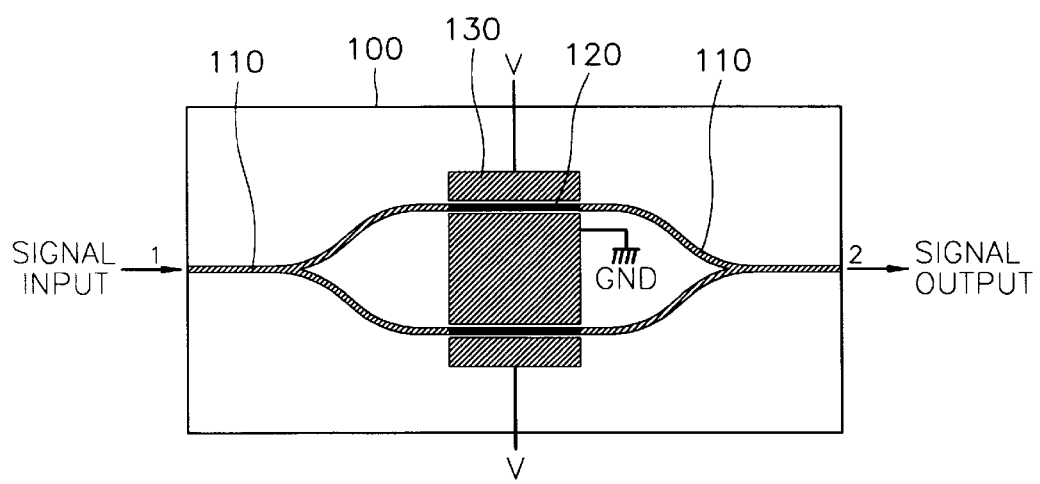

FIGS. 14A and 14B respectively show a directional coupler type optical switch and a Mach-Zehnder type optical modulator constructed as preferred embodiments of the present invention. FIG. 14A shows a directional coupler type optical switch which is one type of an optically active device. An optical signal input from an input port 1 passes through a waveguide 110 made of linear optical polymer having a low light traveling loss within the optically active device. The optical signal is changed in its optical characteristics by the voltage directly applied to the electrode 130, and by an electrostatic field, while passing through the waveguide 120 made of the non-linear optical polymer of the electrode portion. The changed, or modulated, optical signal passes subsequently through the waveguide 110 made of the linear optical polymer and is output to an output port 3 or 4, which serves as an optical switch.

FIG. 14B shows a Mach-Zehnder type optical modulator constructed as another preferred embodiment of the present invention. The optical signal input from the input port I passes through the waveguide 110 made of linear optical polymer having a low light traveling loss within the optically active device. The optical signal is changed in its optical characteristics by the voltage directly applied to the electrode 130 or by an electric field while passing through the waveguide 120 made of the non-linear optical polymer within the electrode portion. The changed, or modulated, optical signal subsequently passes through the waveguide 110 made of the same linear optical polymer and is output to an output port 2. The thus output optical signal modulates the intensity of the initial optical signal.

Since the optically non-linear effect occurs only at the region where an electrode is disposed during fabrication of the optically active device using optical polymer, a waveguide core is formed by non-linear optical polymer only at, and immediately adjacent to, the electrode portion, and a waveguide core is formed in the remaining regions where the non-linear effect is not necessary by using linear optical polymer having a light traveling loss that is lower than the non-linear optical polymer. Therefore, the overall injection loss of the optically active device can be reduced.

The foregoing paragraphs describe low-loss optically active devices using optical polymer for reducing the losses of waveguides in comparison to devices formed with all of the core regions of the waveguide using non-linear optical polymer. Only the core regions of the waveguide where optical modulation effects occur are formed of non-linear optical polymer, and the waveguide of the remaining core regions of the device are formed of linear optical polymer. By such expedients as, for example, forming a waveguide core by injecting non-linear optical polymer into only a waveguide region where a non-linear effect occurs, the resulting optically active devices exhibit reduced losses. As described, in these processes for fabricating optical waveguide devices using non-linear polymer in accordance with the principles of the present invention, a waveguide made of non-linear optical polymer may be selectively formed only at the region where the non-linear effect occurs, thereby improving the overall performance of the device.

Also, a waveguide may be formed by using non-linear optical polymer only at the region where a non-linear effect such as optical modulation or optical switching occurs, and the waveguide is formed using linear optical polymer at the remaining optically conducting regions, thereby minimizing the overall waveguide losses of the waveguide in comparison with a device constructed with all of the regions of the waveguide formed by using a non-linear optical polymer. Also, according to the principles of the present invention, it is not necessary to precisely align two cores respectively formed of non-linear optical polymer and linear optical polymer.

What is claimed is:

1. A method for fabricating an optically active device having an optical waveguide core having a non-linear core region and a linear core region, the method comprising the steps of:

forming a lower clad layer having optical transparency on a substrate;

forming a linear optical polymer layer, for forming a portion of the waveguide core, on the lower clad layer by coating linear optical polymer having a refractive index greater than that of the material of the lower clad layer;

forming a first metal layer at a region on the lower clad layer, for masking length boundaries, perpendicular to the waveguide core path, of the linear optical polymer waveguide core across the width of the substrate;

etching the portions of the linear optical polymer layer without the first metal layer formed thereon;

forming a non-linear optical polymer layer having a refractive index greater than that of the material of the lower clad layer, for forming a portion of the waveguide core, on the substrate having the linear core region removed;

removing that portion of the non-linear optical polymer layer which is stacked higher than the waveguide core regions;

removing the first metal layer;

forming a second metal layer on the waveguide from which the first metal layer is removed, for determining the width of the waveguide core across the length of the substrate;

removing the linear optical polymer and non-linear optical polymer not masked by the second metal layer portion;

removing the second metal layer; and forming an upper clad layer on the substrate with the linear optical polymer using a material having a refractive index lower than that of the waveguide core regions and having optical transparency.

2. The method according to claim 1, wherein the step of forming the lower clad layer is performed by a spin-coating method.

3. The method according to claim 1, wherein the step of forming the first metal layer comprises the steps of:

coating a photoresist on the lower clad layer;

aligning photomasks of a predetermined pattern on the substrate to selective expose the photoresist to UV light;

dipping the photoresist into a developer liquid for development and baking the same to form a photoresist pattern;

depositing the first metal layer on the substrate having the photoresist pattern by a vacuum deposition method; and lifting off the photoresist and metal deposited thereon.

4. The method according to claim 1, wherein the step of etching the linear optical polymer is performed by applying $O_2$ plasma to over the substrate under a vacuum state.

5. The method according to claim 1, wherein the non-linear optical polymer material has non-linear optic chromophores as its functional groups.

6. The method according to claim 1, wherein the step of forming the second metal layer is performed by vacuum deposition and photolithography.

7. The method according to claim 1, wherein the linear optical polymer is a material having optical transparency against the wavelength of the light in use and an optical waveguiding loss than the non-linear optical polymer.

8. The method according to claim 1, further comprising the step of:

forming an electrode on the region made of the non-linear polymer to provide the non-linear effect thereto.

9. The method according to claim 1, further comprising the step:

forming an electrode beneath the region made of the non-linear polymer to provide the non-linear effect thereto.

10. The method according to claim 1, further comprising the step of:

forming each electrode both on and beneath the region made of the non-linear polymer to provide the non-linear effect thereto.

11. A method for fabricating an optically active device having at least one optical waveguide constructed of a non-linear optical waveguide core region and a linear optical waveguide core region, the method comprising steps of:

forming a planar substrate from a silicon wafer or glass;

forming, on the substrate, a lower clad layer optically transparent to the wavelength of light to be conducted by the non-linear and linear waveguide core regions;

forming a linear optical polymer layer on the lower clad layer by coating linear optical polymer having a refractive index greater than a refractive index of the lower clad layer;

forming a first metal layer at a region on the linear optical polymer layer, said first metal layer leaving a central portion of said linear optical polymer layer exposed, for defining the length of an optical waveguide core region across the width of the substrate;

etching away said exposed central portion of said linear optical polymer layer;

forming a non-linear optical polymer layer on exposed surfaces of said lower clad layer, said linear optical polymer layer and said first metal layer, said non-linear optical polymer layer being formed by coating linear optical polymer having a refractive index greater than the refractive index of the lower clad layer;

removing the non-linear optical polymer layer outside said central portion of said linear optical polymer layer and the non-linear optical polymer layer over said central portion of said linear optical polymer layer stacked higher than linear optical polymer layer;

removing the first metal layer;

forming a second metal layer over a portion of said linear and non-linear optical polymer layers for determining the width of the optical waveguide across the length of the substrate;

removing the portions of said linear and non-linear optical polymer layers not masked by the second metal layer to form said linear and non-linear optical waveguide core regions, respectively;

removing said second metal layer; and encasing said linear and non-linear optical waveguide core regions by forming an upper clad layer on the said linear and non-linear optical waveguide core regions and said lower clad layer, said upper clad layer having a refractive index lower than the linear and non-linear optical waveguide core regions and being optically transparent to the wavelength of light to be conducted by the non-linear and linear waveguide core regions.

12. The method according to claim 11, wherein the step of forming the lower clad layer is performed by a spin-coating method.

13. The method according to claim 11, wherein the step of forming the first metal layer comprises the steps of:

coating a photoresist on the lower clad layer;

aligning photomasks of a predetermined pattern on the substrate to selective expose the photoresist to UV light;

dipping the photoresist into a developer liquid for development and baking the same to form a photoresist pattern;

depositing the first metal layer on the substrate having the photoresist pattern by a vacuum deposition method; and lifting off the photoresist and metal deposited thereon.

14. The method according to claim 11, wherein the step of etching the linear optical polymer is performed by applying $O_2$ plasma to over the substrate under a vacuum state.

15. The method according to claim 11, wherein the non-linear optical polymer material has non-linear optic chromophores as its functional groups.

16. The method according to claim 11, wherein the step of forming the second metal layer is performed by vacuum deposition and photolithography.

17. The method according to claim 11, wherein the linear optical polymer is a material having optical transparency against the wavelength of the light in use and an optical waveguiding loss than the non-linear optical polymer.

18. The method according to claim 11, further comprising the step of:

forming an electrode on the region made of the non-linear polymer to provide the non-linear effect thereto.

19. A method as set forth in claim 11, further comprising a step of fabricating an optically active device having two optical waveguides, wherein each of said optical waveguides is constructed of a non-linear optical waveguide core region and a linear optical waveguide core region.

* * * * *